United States Patent

Fosbøl et al.

[11] Patent Number: 5,957,041
[45] Date of Patent: Sep. 28, 1999

[54] CONTINUOUS BOILER FOR ORGANIC MATERIALS, E.G. FISH

[75] Inventors: Peder Fosbøl, Lyngby; Jørgen Steen Christensen, Farum, both of Denmark

[73] Assignee: Atlas Industries A/S, Ballerup, Denmark

[21] Appl. No.: 08/716,237
[22] PCT Filed: Mar. 27, 1995
[86] PCT No.: PCT/DK95/00133
  § 371 Date: Sep. 20, 1996
  § 102(e) Date: Sep. 20, 1996
[87] PCT Pub. No.: WO95/26142
  PCT Pub. Date: Oct. 5, 1995

[30] Foreign Application Priority Data

Mar. 29, 1994 [DK] Denmark ............................ 0361/94

[51] Int. Cl.⁶ .............................. A23L 1/01; A23L 1/325; F28D 11/02; A23J 1/10
[52] U.S. Cl. .................... 99/483; 99/348; 99/470; 99/516; 165/91; 165/94; 165/109.1; 165/120; 422/189; 422/269; 530/357
[58] Field of Search ................. 99/470, 483, 517, 99/467; 137/575; 210/787; 414/296; 425/556, 574, 236; 422/106, 189, 110, 269, 308, 273; 426/417, 455, 644, 456, 646, 570, 602, 580, 582, 491, 7, 9, 231; 165/91, 94, 109.1, 120, 169; 366/144–146, 149; 530/357

[56] References Cited

U.S. PATENT DOCUMENTS 4,126,177  11/1978  Smith et al. .
4,159,982  7/1979  Hermansson ..................... 426/657 X
4,212,889  7/1980  Fuentevilla ...................... 422/106 X
4,216,239  8/1980  Gloppestad ........................... 210/787
4,344,976  8/1982  Bladh ..................................... 426/472
4,504,509  3/1985  Bell et al. ............................. 426/549
4,532,144  7/1985  Vernet ................................... 426/643
4,637,937  1/1987  Terada et al. ........................ 426/570
4,667,590  5/1987  Balaam et al. .................... 99/483 X
4,713,254  12/1987  Childs et al. ........................ 426/582
4,768,260  9/1988  Sandberg ............................. 425/556
4,768,325  9/1988  Lindee et al. ......................... 53/122
4,808,334  2/1989  Ezaki et al. ......................... 252/314
5,474,790  12/1995  Franklin et al. ..................... 426/417

FOREIGN PATENT DOCUMENTS 134727  8/1976  Norway .

OTHER PUBLICATIONS

Fishmeal Production at Sea—Food Engineering International Feb. 1980.

Primary Examiner—Timothy F. Simone
Attorney, Agent, or Firm—Antonelli, Terry, Stout & Kraus, LLP

[57] ABSTRACT

A continuous boiling apparatus (1) for organic materials, e.g., fish or offal from abattoirs, comprises at least one annular boiling zone (15) with an inlet opening (13) for the raw material and a discharge opening (4) for the heat-treated raw material. The annular boiling zone (15) is defined by circular, con-centric heating plates (5), each made up of circular, con-centric parts (6, 7) between which a heating medium is introduced (8). In the boiling zone (15) there are provided a number of feeding elements (10) with self-regulating scrapers (16) which lie up against heating surfaces (6) and divide the boiling zone (15) into sub-zones.

12 Claims, 4 Drawing Sheets

5,957,041

CONTINUOUS BOILER FOR ORGANIC MATERIALS, E.G. FISH

BACKGROUND OF THE INVENTION

The Invention relates to a continuous boiling apparatus the kind for organic materials, e.g. fish or offal from abattoirs.

Such continuous boiling apparatus is known in various con-figurations and is arranged for heat treatment, coagulation or boiling of raw organic materials, e.g., raw fish or offal from abattoirs and the like, which is boiled before further processing in the manufacture of various products such as fish oil, fishmeal, meat-and-bone meal, blood meal etc.

A commonly-known apparatus, for example the applicants' own "Continuous Indirect Boiler", consists of a horizontally-lying worm conveyor surrounded by a jacket, where both the jacket and the worm conveyor are heated with steam. When desired to have a large capacity, apparatus of this kind becomes very voluminous. For example, a boiling apparatus with a capacity of 27 tons of fish per hour will have a length of approx. 14 m, a height of approx. 1.8 m, a breadth of approx. 1.5 m and a weight of approx. 16 tons. To drive the worm conveyor, quite a large electromotor is required with a power consumption of approx. 11 kW. Apparatus of this kind is voluminous but, however, the greatest disadvantage is that the raw material has a great tendency to leave deposits on the inside heating surfaces due to the fast burning of the organic material. During operation, considerable deposits are left on both the jacket and the worm conveyor. Such deposits are highly undesirable, the reason being that the capacity is drastically reduced. Normally, the deposits are removed in connection with the stopping of the apparatus and subsequent cleaning by soaking with lye or the like and/or high-pressure sluicing, i.e. methods which are extremely time-consuming and which reduce the total capacity of the apparatus, the reason being that such cleaning takes a long time and must be carried out at relatively frequent intervals. With the object of extending the operation time between cleaning, it is known during operation to use a direct injection of steam into the boiling zone. However, there is the great disadvantage that the raw material is attenuated and gets mixed with the condensating steam, the result being that extra energy and resources must be used to remove the condensate.

The use of a boiler with a worm conveyor often results in an uneven boiling of the raw material, in that the raw material is not stirred while being fed forward but merely pushed forwards by the worm thread, and is boiled or heat-treated by the heat infiltrating the raw material from both sides. Consequently, if it is to be ensured that all the raw material has been completely boiled or heat-treated as desired, this demands a relatively long period of time in such a boiling apparatus. At the same time, a part of the raw material will be over-boiled.

Norwegian published application no. 134,727 describes a vertically-positioned, tubular boiler for the heat treatment of proteinaceous fish material where the product mass is heated by heating plates for steam and by introducing steam directly and contrary to the flow of the product mass. The latter has the great disadvantage that the product mass is attenuated by condensate which must be removed afterwards in an energy-consuming process. The boiler has combined scrapers and stirring means lifting the product mass along the wall of the boiler contrary to the direction of transport and thereby contrary to gravitation, this being highly energy-consuming. The boiler is closed off from the surroundings and the raw material is introduced through a worm conveyor. Consequently, the raw material must be comminuted before being introduced. Thus, the boiler consumes a relatively large amount of energy to ensure stirring and that the wall of the boiler is scraped clean. It will moreover be necessary at intervals to clean the large number of threaded stirring means and the stationary steam induction nozzles etc., which requires that the boiler is stopped and emptied at intervals.

The company Alfa-Laval has produced another type of vertical boiler under the name "Contherm" for the boiling of fish pulp, chopped and comminuted offal from abattoirs etc. In order to avoid burning-in on the heating surfaces consisting of a steam-heated jacket, the boiling chamber has internal scrapers for continuous cleaning. The boiler requires that the raw material is comminuted and also consumes a large amount of energy for the scrapers. The boiler is closed and under pressure as the material is fed forward by means of the pressure difference between a bottom inlet and a top outlet, i.e. contrary to gravitation. As an example, a boiler with a capacity of only 1.1 tons of comminuted raw material per hour requires a drive motor of 7.5 kW for the scrapers.

SUMMARY OF THE INVENTION

The continuous boiling apparatus of the present invention includes heating plates for heat-treating the raw material by contact during transport by means of a feeding element from the apparatus inlet opening for raw materials to a discharge opening for the heat-treated raw material. The heating plates comprise at least two substantially vertical and in section, substantially circular and concentric heating surfaces, in between which the raw material is fed by a number of feeding elements which lie up against the heating surfaces and divide the boiling zone into sub-zones. The feeding elements comprise means for scraping the heating surfaces.

By configuring a continuous boiling apparatus in this manner, a number of advantages are achieved which cannot be achieved with apparatus of the known kind.

It is an important advantage that the apparatus becomes self-cleaning and can thus be run in continuous operation to a much greater degree than the known kinds of apparatus. Compared with the known apparatus, there is thus achieved a boiler with greater capacity, in that the heating surface is held clean and recurring cleaning routines are avoided.

By making the boiling zone substantially circular and annular, the apparatus can be much more compact, which means that it can be insulated in a more simple and less expensive manner against thermal loss to the surroundings. The new mode of operation also results in a smaller drive motor, and less electrical energy being required to feed the raw material through the boiling zone from inlet to outlet. The concentric construction of the main parts, especially the heat surfaces etc., also results in reduced plant costs. Moreover, it is possible to provide a uniform and relatively great clearance in the boiling zone all the way from the inlet to the outlet, so that the raw materials need only a slight degree of comminution before being introduced into the boiling apparatus. An apparatus according to the invention and with a capacity of 27 tons of fish per hour will have a height of approx. 1.5 m, a diameter of approx. 3 m, and will only require a drive motor with an effect of approx. 5–6 kW.

By configuring each heating surface as two concentric and cylindrical parts with a substantially circular cross-sectional profile through which a heating medium is introduced, great advantages are achieved in the production of the apparatus from the point of view of production technique, and the heat surfaces etc. can be replaced when worn or damaged, which is almost impossible with the apparatus of the known kinds.

The heating surface can be divided into sections in that least one dividing wall is placed between the two parts of the heating plate, whereby the possibility is provided of graduating the heating and of reducing the difference in temperature between the heating surfaces and the raw material, further reducing the risk of burning-in and deposits.

By making the side of each heating surface which faces towards a boiling zone smooth and without joints, the heating surfaces can be scraped completely clean during the continuous operation, so that the apparatus is self-cleaning and does not need to be stopped at intervals for cleaning.

The boiling apparatus according to the invention can be configured with a number of heating plates arranged in a concentric manner and configured with different diameters. The possibility is thus provided of configuring boilers with different capacities by increasing the number of boiling zones in the same apparatus. Moreover, the capacity of the apparatus can be increased by adding a further boiling zone with greater diameter around the boiling zones of the apparatus, which means that an already-acquired boiling apparatus of this kind can later be upgraded or scaled up for greater capacity. In addition, the thermal loss to the surroundings is further reduced, in that only the extreme outer heating surfaces can radiate heat to the surroundings.

By configuring the scrapers of each feeding element to lie up against a heating surface and mounting the scrapers on and supported by substantially vertical support elements, the scrapers are given support so that they remain vertical and maintain a seal against the heating surfaces, even when the apparatus is being operated at full capacity.

The drive for the boiling apparatus to which each support element is secured can, for example, be configured a rotating drive element disposed in a horizontal plane. The horizontally-rotating driving element can be driven by an electromotor via a reduction gear, which provides a uniform and even feed with a well-defined period of time for the raw material in the boiling zone. By regulation of the electromotor, e.g. by frequency regulation of the motor supply current, the speed of rotation can be regulated and herewith the period of time for which the raw material is in the boiling zone.

By configuring the scrapers as scraper blades mounted on a vertical element around which the scraper blades can be turned, and making the scraper blades forwardly extending in the feeding direction from the vertical element and each lying up against its heating surface, they are made self-cleaning with regard to their contact pressure against the heating surface. Consequently, it is not necessary to provide special mechanisms or the like to provide the contact pressure.

By pre-stressing the scrapers e.g., by spring loading in the boiling apparatus, it is ensured that they are always pressed in a sealing manner against the heating surface. The scrapers are already pressed against the heating surface as a result of the pressure from the raw material lying in front, but a further spring-loading of each scraper ensures that the seal is maintained, even at the discharge outlet where, of course, the pressure from the raw material disappears.

The scrapers in the boiling apparatus according to the invention are preferably exchangeable. This provides the possibility of replacing the scrapers after wear, but also provides a good possibility of exchange with scrapers of another shape. The function of the scrapers is namely that they shall effect a certain stirring in the raw material, and this can be achieved by a suitable configuration of the scrapers, depending on the type of raw materials etc. which are to be heat-treated or boiled.

By configuring the boiling apparatus according to the invention such that each feeding arm extend transversely over the whole of the apparatus, and at each side supports a feeding element for each boiling zone, a robust and rigid construction is achieved with uniform feeding of the raw material, and where, with a suitable number of transverse feeding arms, it is possible to divide the boiling zone into a suitable number of sub-zones.

Finally, scrapers can be so large that they form a seal against the heating surfaces all the way to the bottom of the billing zone and seal against the bottom of the boiling zone. It is hereby achieved that the individual sub-zones are separated from one another, so that escape of unboiled raw materials in the area around the discharge opening is avoided. Moreover, the possibility is provided of being able to boil raw materials, e.g. fish, in reduced amounts, without changes having to be made to the apparatus.

Without problems and without changes in construction, the apparatus according to the invention will be able to be operated with a reduced amount of raw material right down to 25% of the maximum production. This is a very great advantage, and none of the known types of boiling apparatus are able to operate with an amount of raw material reduced to this extent. When the boiling apparatus comprises several boiling zones, it can be operated with an even smaller production by shutting off one or more zones. Furthermore, the apparatus can be regulated by adjusting the speed of the drive motor and/or regulation of the boiling temperature.

BRIEF DESCRIPTION OF THE DRAWINGS

The invention will now be described in more detail with reference to the drawing, in that FIG. 1 is a principle diagram which shows an apparatus according to the invention and its function in an embodiment with one annular boiling zone.

DESCRIPTION OF THE PREFERRED EMBODIMENTS

Figure 1:
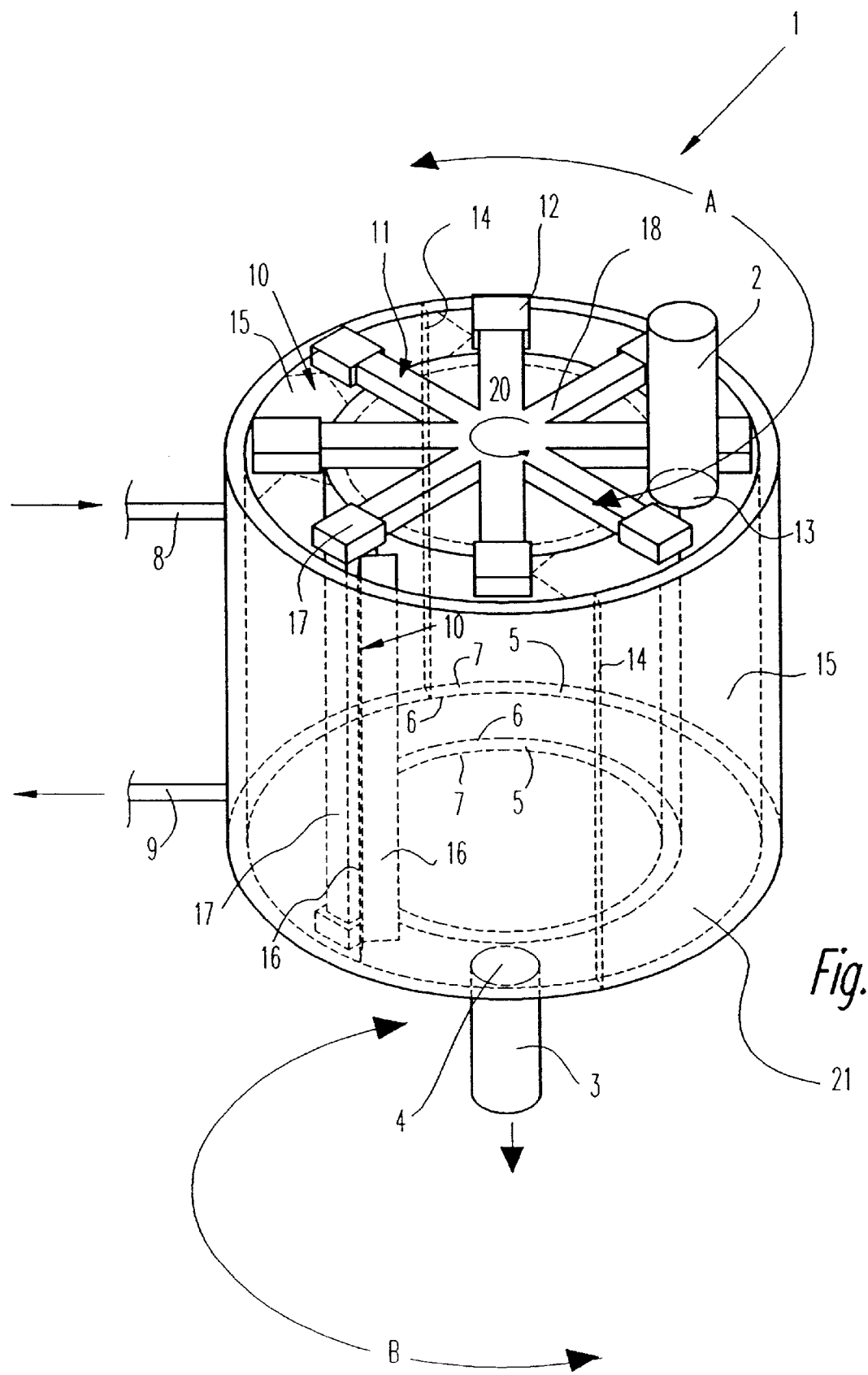

In FIG. 1, which is a principle diagram, the apparatus 1 is shown in its basic form, i.e., with one annular boiling zone.

The annular boiling zone 15 is configured by being defined by two cylindrical, annular heating plates 5 with vertical walls. Each heating plate 5 consists as shown in the drawing of tubular or cylindrical plate elements 6, 7, where the walls 6, which face towards each other, comprise a heating surface, and the annular walls 7, which face away from each other, constitute outer walls in the heating plates 5. To the space between the walls 6, 7, steam or another heating medium is fed via the inlet pipe 8, and condensate or cooled heating medium is removed through the pipe 9. Since FIG. 1 is only a principle diagram, the pipe arrangement itself is not shown. Provided hereby are the heating plates 5 with annular heating surfaces 6 which face towards each other, said heating surfaces 6 defining an annular boiling zone 15 which lowermost is defined by the bottom 21 and which in principle is open at the top, but naturally covered, which is explained later with reference to FIG. 3. The outwardly-facing sides of the heating plates 5 will in practice naturally be insulated to reduce thermal loss to the surroundings. The fact that the boiling zone is open at the top is of great practical advantage for inspection, cleaning, maintenance etc.

Raw materials, e.g. fish, are fed to the annular heating zone 15 via a supply pipe 2 which has an outlet 13 disposed above the boiling zone 15.

Heat-treated or boiled raw material, e.g. boiled fish, is led out through the outlet pipe 3 which is coupled to a discharge opening 4 in the bottom 21.

The annular boiling zone 15 is divided into a number of sub-zones by a number of radial feeding elements 10 arranged in the annular boiling zone. Each feeding element 10 is supported by a support element, e.g. a vertical beam 17, which is in fixed engagement with a rotating feeding mechanism 11 comprising a number of feeding arms 18 which are driven around in the direction of the arrow 20 by a motor (not shown). In the example shown in FIG. 1, there are four transverse beams, which gives rise to eight feeding arms 18, where on each of which there is coupled a vertically-arranged support element with feeding element 10 in the form of scrapers 16, which will be explained later. For the sake of clarity, the drawing shows only one feeding element with a set of scrapers 16, but it will be clear from the foregoing that in practice the example shown will have eight feeding elements with scrapers, so that the boiling zone 15 is divided into eight sub-zones.

From the above it will be clear that the raw material will be fed via the inlet pipe 2 to a sub-zone which is shut off from the rest of the zone 15 by two feeding elements 10, and that the raw material will remain in this sub-zone during its rotary transport until the relevant sub-zone reaches the discharge opening 4, from where it will flow out through the outlet pipe 3 for further processing. During its passage around the annular boiling zone, the raw material is boiled or heat-treated while being fed by the feeding elements 10 and while to some extent being stirred due to the shape of the scrapers 16, which will be explained later.

The feeding mechanism 11 is rotated, and always in the same direction, around a vertical axis in the feeding direction 20, and is driven by a not-shown electromotor and gear which reduces the number of revolutions, so that the cycle time for one complete revolution of the feeding mechanism 11 will be in the order of 3–6 minutes. Therefore, the feeding element 10 must be sealed against the walls of the boiling zone 15, so that the raw material can not be fed directly from the inlet pipe 2 to the outlet pipe 3, but is forcibly transported around during heat treatment.

The heating plates 5 can be divided into several zones by dividing plates 14. In FIG. 1 it is shown how the outer heating plate 5 is divided into two zones, i.e. the zone A and the zone B. This provides the possibility of being able to work with different temperatures in the heating plates 5 in the different zones A, B, so that the difference in temperature between the heating plate's heating surface 6 and the raw material does not become too great, in that the risk of burning-in is hereby reduced. The steam temperature and herewith the steam pressure in zone B will preferably be greater than in zone A.

Figure 2:
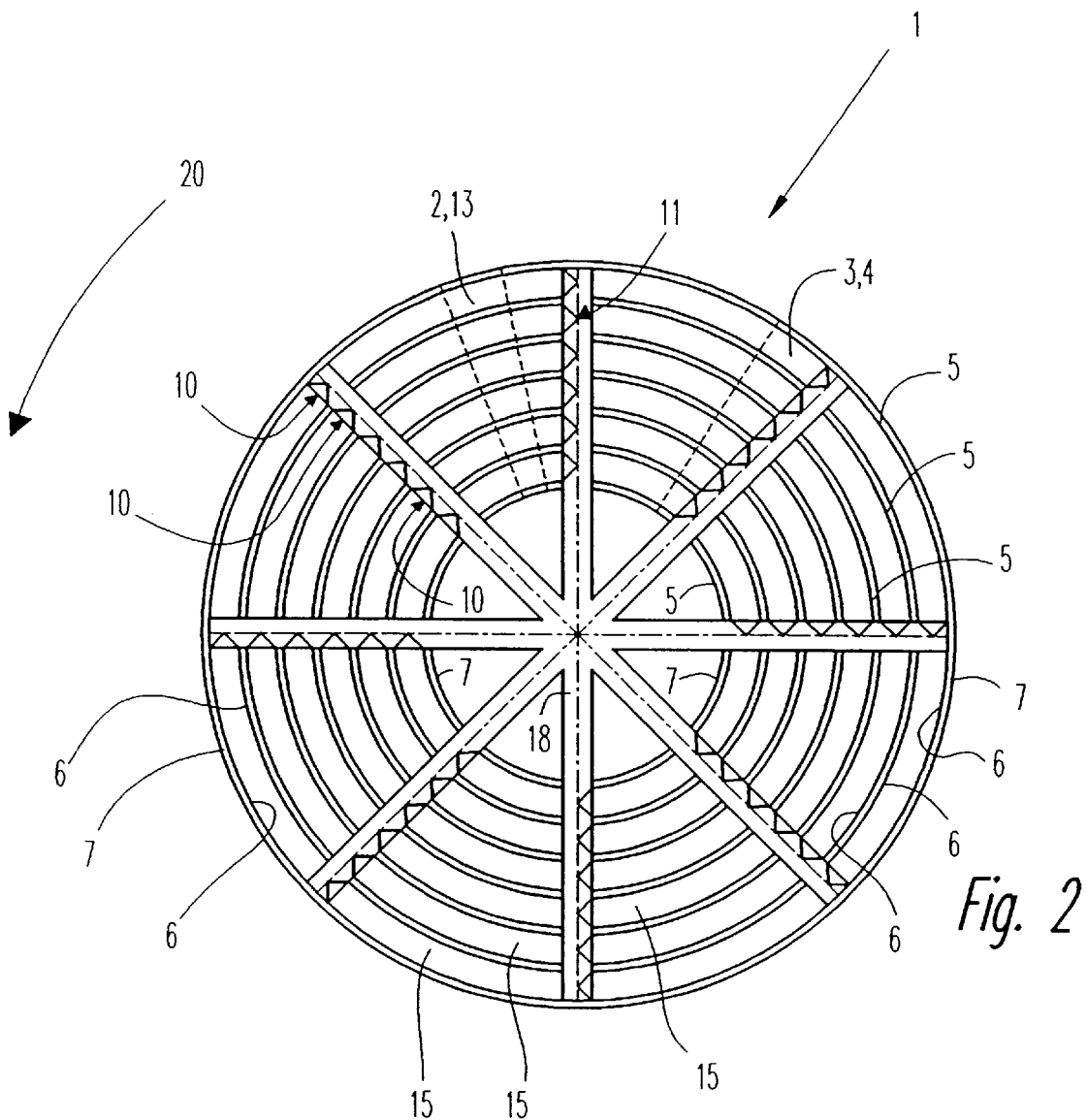
FIG. 2 shows a second embodiment of the apparatus according to the invention seen from above, and where the apparatus has six annular boiling zones.

In FIG. 2 is shown a continuous boiling apparatus according to the invention seen from above and with six annular boiling zones arranged concentrically around one another, and in such a manner that heating plates 5 between boiling zones deliver heat to two adjacent zones. This provides a more compact apparatus, and two adjacent zones 15 can be heated by the same heating plate 5. FIG. 2 shows inlet 2, 13 and outlet 3, 4, and it is clearly seen that there will always be at least one set of feeding elements 10 with scrapers between the inlet 13 and the discharge opening 4. It should be noted that the reference numbers in FIG. 2 indicate the same parts as in FIG. 1.

It will be seen from FIG. 2 that it is possible to construct a continuous boiling apparatus according to the invention of almost any size by increasing or reducing the number of annular boiling zones. This also makes it possible to upgrade already installed boilers, or provides the possibility of operating a boiling apparatus with greatly reduced capacity, in that some of the boiling zones 15 can be completely closed off. Furthermore, the capacity of the boiler can be regulated by varying the height to which the apparatus is filled.

Figure 3:
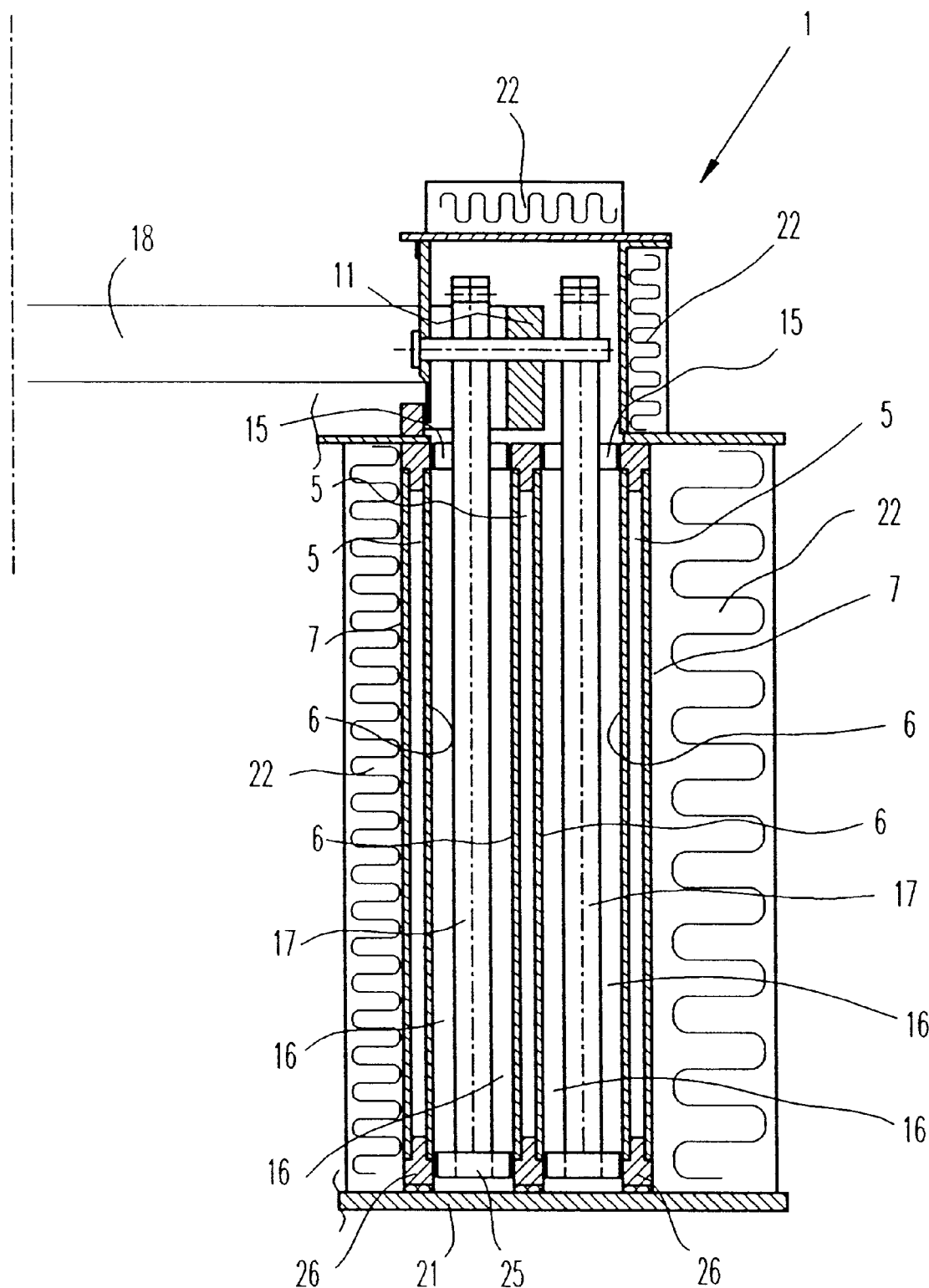
FIG. 3 shows a plane, vertical section in an apparatus according to the invention and with two annular boilng zones.

In FIG. 3 is seen a vertical, plane section through an apparatus according to the invention with two annular boiling zones on a greater scale and in more detail. The two boiling zones thus comprise three heating plates 5, the centre-most of which is arranged for heating with two heating surfaces 6, and the outer heating plates 5 each being arranged with an inwardly-facing heating surface 6 and a chamber wall 7 which faces outwards.

FIG. 3 also shows how the annular boiling zones can be shut off at the top to reduce annoying odours, evaporation etc., and also how outwardly-facing surfaces can be covered with insulating material 22 for the reduction of thermal loss to the surroundings and uneccessary heating of production premises etc.

In FIG. 3 is seen the outwardly-extending end of the feeding mechanism 11, which carries two vertical support elements 17 in the form of vertical beams which support the scraper elements 16, which will be explained later with reference to FIG. 4. Lowermost, the boiling zones 15 are closed by a bottom 21. This is a thick, annular plate of solid steel into which are screwed annular base pieces 26 for the mounting of the annular walls 6, 7 of the heating plates 5. The vertical beams 17 are equipped at the bottom with a transverse element 25 which ensures that the beams 17 remain centrally in the boiling zone 15, even when exposed to great mechanical influences.

Figure 4:
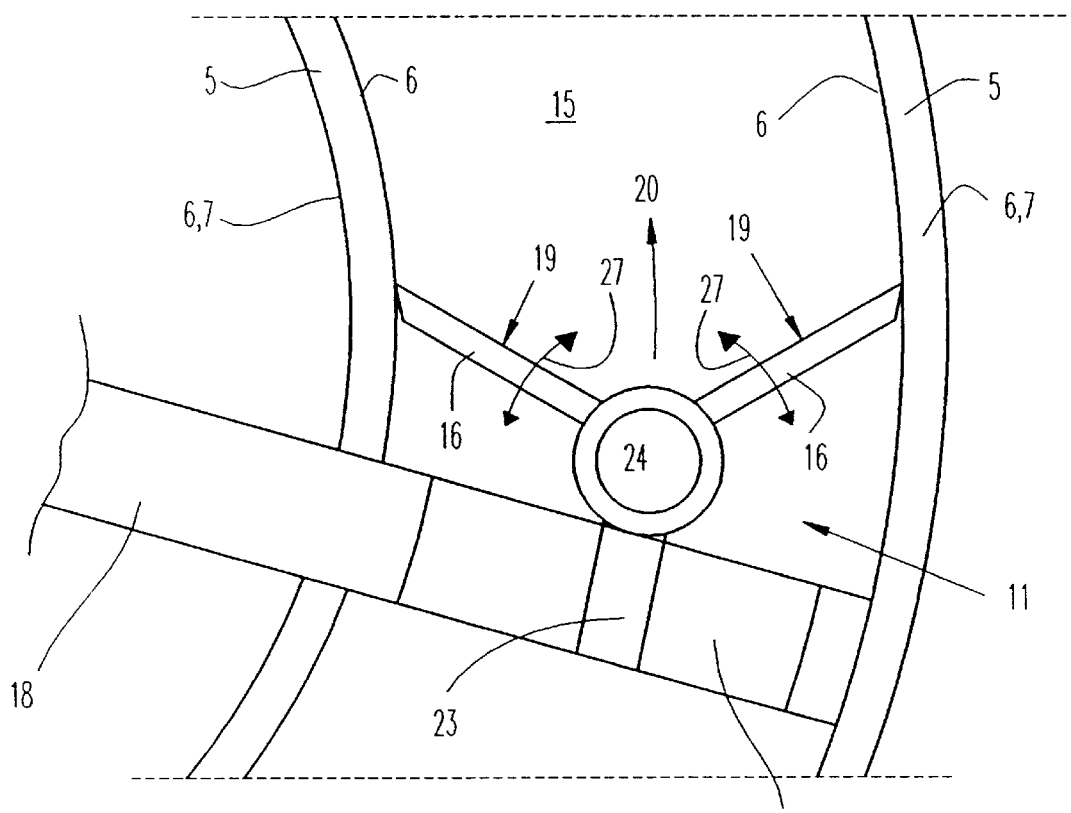
FIG. 4 shows in principle and on a greater scale how the feeding element with scrapers is arranged and how it functions.

FIG. 4 shows in principle on a larger scale and seen from above how the feeding mechanism 11 is configured and, via a coupling 23 or the like, how it is secured and supported in its vertical extent by the vertical beam 17 which is solidly secured to the feeding arm 18.

The feeding mechanism 11 is driven in the direction 20. The feeding mechanism comprises a central part 24 which consists of a pivot link or the like, so that the feeding mechanism's scrapers or blades 16 can turn or swing within a limited area as shown by the double arrow 27. Possible tolerances in the breadth of the boiling zone 15 are hereby equalized, and the scrapers 16 will always lie against the heating surfaces 6. In addition hereto, the scrapers 16 are loaded with a pressure illustrated by the arrows 19, e.g. stemming from spring mechanisms or the like in the link 24, so that the scrapers 16 lie with suitable contact pressure up against the heating surfaces 6, even when the counter-pressure from the product mass in front of the scrapers disappears which, of course, it does at the discharge opening. Moreover, there occurs an automatic regulation of the contact pressure of the scraper blades against the heating surfaces 6 which stems from the product mass or raw mass lying in front of the blade, in that the feeding mechanism 11 is mechanically driven by the feeding arm 18 against the product mass in the direction 20 as described above.

The scrapers 16 shown in FIGS. 3 and 4, which extend at a certain angle from the central pivot link 24 and in the feeding direction 20 towards the heating surfaces 6, are only an example of how the scraper blades 16 can be configured. The scraper blades 16 will be able to be configured in various ways in order to increase or decrease the degree of stirring in the product mass, and to ensure a permanent, continuous scraping clean of the heating surfaces 6, and also to provide a self-regulation of the contact pressure. Moreover, it is not necessary for the scrapers 16 to be identical in each feeding mechanism, which can also increase the stirring. Since the outer edges of the scraper blades will be exposed to a certain degree of wear, the scraper blades are mounted on the pivot link 24 in a manner which allows them to be replaced. The possibility of replacement also has the advantage that use can be made of scraper blades of different kinds and different shapes. The outer edges or shares of the scraper blades can be provided with wear parts which are replaceable.

In one embodiment of the invention, the distance between the heating plates 5 is approx. 10 cm. It will thus be sufficient for the incoming raw matarial to be coarsely chopped so that it does not consist of pieces which are larger than 10 cm.

To increase the stirring, it will be possible to place further means in front of the feeding mechanism 11 if this is necessary out of regard for the raw material to be boiled. Such stirring elements can consist, for example, of a feeding element from which the scrapers on the one side have been removed.

Regardless of how the feeding elements 11 are configured, the boiling zone 15 will have a uniform clearance all the way around; a clearance which has a breadth corresponding to the distance between the heating surfaces 6 and a height corresponding to the height of the heating plates 5, which means that the raw material, e.g. raw fish or offal from abattoirs, receives uniform heat treatment for a well-defined period of time in the boiling apparatus.

We claim:

1. Continuous boiling apparatus for organic materials, comprising: an apparatus inlet opening for raw materials; a discharge opening for discharging heat-treated raw material; heating plates which comprise at least two substantially vertical and in section substantially circular and concentric heating surfaces, in between which is defined an annular boiling zone, the raw material being heat-treated by contact with the heating surfaces; a plurality of feeding elements for feeding the raw material from the inlet opening to the discharge opening, the feeding elements lying up against the heating surfaces and dividing the boiling zone into subzones, the feeding elements comprising scrapers for scraping clean the heating surfaces.

2. Boiling apparatus according to claim 1, wherein each heating surface comprises two concentric and cylindrical parts configured with a substantially circular cross-sectional profile through which a heating medium is introduced.

3. Boiling apparatus according to claim 2, wherein each heating surface is divided into sections, in that at least one dividing wall is placed between the two parts of the heating plate.

4. Boiling apparatus according to claim 1, wherein a side of each heating surface which faces towards the boiling zone between two heating plates is smooth and without joints which break the surface.

5. Boiling apparatus according to claim 1, wherein a number of heating plates are arranged in a concentric manner and configured with different diameters, thus providing a number of concentric, annular boiling zones, all with substantially vertical heating surfaces.

6. Boiling apparatus according to claim 1, wherein each feeding element comprises scrapers arranged to lie up against a heating surface, said scrapers being mounted on and supported by substantially vertical support elements.

7. Boiling apparatus according to claim 6, wherein each support element is secured to a rotating driving element with feeding arms, said driving element being disposed in a horizontal plane over the apparatus.

8. Boiling apparatus according to claim 1 or 6, wherein the scrapers are configured as scraper blades mounted on a vertical element around which the scraper blades can be turned, and in that they are forwardly-extending in the feeding direction from the vertical element and each lying up against its heating surface.

9. Boiling apparatus according to claim 1 or 6, wherein each scraper is spring-loaded so that the scraper is pressed up against the heating surface.

10. Boiling apparatus according to claim 6, wherein the scrapers are exchangeable.

11. Boiling apparatus according to claim 7, wherein each feeding arm extends transversely over the whole of the apparatus, and at each side supports a feeding element for each boiling zone.

12. Boiling apparatus according to any of the claims 1, 6, 7, or 10, wherein the scrapers are so large that they form a seal against the heating surfaces all the way to a bottom (21) of the boiling zone, and in that they are also arranged to seal against the bottom of the boiling zone.

\* \* \* \* \*